United States Patent
Johnsen (10) Patent No.: US 9,614,746 B2
(45) Date of Patent: Apr. 4, 2017

(54) SYSTEM AND METHOD FOR PROVIDING ETHERNET OVER NETWORK VIRTUAL HUB SCALABILITY IN A MIDDLEWARE MACHINE ENVIRONMENT

(75) Inventor: Bjorn-Dag Johnsen, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/235,187

(22) Filed: Sep. 16, 2011

(65) Prior Publication Data

US 2012/0072564 A1    Mar. 22, 2012

(51) Int. Cl.
*G06F 15/173* (2006.01)
*H04L 12/701* (2013.01)
*H04L 12/46* (2006.01)
*H04L 12/24* (2006.01)
(Continued)

(52) U.S. Cl.
CPC ............ *H04L 45/00* (2013.01); *H04L 12/462* (2013.01); *H04L 41/0659* (2013.01); *H04L 45/50* (2013.01); *H04L 69/40* (2013.01)

(58) Field of Classification Search
CPC ........... H04L 41/0213; H04L 29/08072; H04L 29/06; H04L 41/0659; H04L 12/462; H04L 45/00; H04L 69/40; H04L 39/329; H04L 67/1097; H04L 63/08; H04L 41/0654; H04L 12/18; H04L 45/16; H04L 49/552;
(Continued)

(56) References Cited

U.S. PATENT DOCUMENTS 5,805,805 A  *  9/1998  Civanlar et al. .............. 709/220
5,964,837 A    10/1999  Chao et al.
6,014,669 A     1/2000  Slaughter
(Continued)

FOREIGN PATENT DOCUMENTS

CN          156787       1/2005
CN         1728664       2/2006
(Continued)

OTHER PUBLICATIONS

InfiniBand[SM] Trade Association, InfiniBand™ Architecture Specification, vol. 1, Release 1.2.1, Nov. 2007, pp. 1-1727.
(Continued)

*Primary Examiner* — Douglas Blair
*Assistant Examiner* — Schquita Goodwin
(74) *Attorney, Agent, or Firm* — Tucker Ellis LLP (57) ABSTRACT

A system and method can support a middleware machine environment that include one or more gateway nodes. One or more gateways that resides on the one or more gateway nodes are provided in a subnet with a plurality of host servers, wherein each host server is associated with one or more virtual network interface cards (vNICs). The middleware machine environment also include a plurality of virtual hubs (vHUB) on the one or more gateways, with each vHUB associated with one or more said vNICs. The gateways are adapted to connect with an external network, and operate to forward a multicast packet to both the external network and the plurality of host servers via the plurality of vHUBs, and prevent multicast packet traffic loops between the subnet and the external network.

20 Claims, 4 Drawing Sheets

(51) Int. Cl.
*H04L 12/723* (2013.01)
*H04L 29/14* (2006.01)

(58) Field of Classification Search
CPC . H04L 49/70; H04L 12/4641; H04L 12/4633; H04L 45/48; H04L 45/74; H04L 45/18
USPC ... 709/223, 220, 232, 238; 370/401, 395.53, 370/395.31, 395.5, 357, 389, 390; 705/37; 710/8
See application file for complete search history.

(56) References Cited

U.S. PATENT DOCUMENTS

| | | | |
|---|---|---|---|
| 6,091,706 A | 7/2000 | Shaffer | |
| 6,202,067 B1 | 3/2001 | Blood | |
| 6,463,470 B1 | 10/2002 | Mohaban et al. | |
| 6,594,759 B1 | 7/2003 | Wang | |
| 6,647,419 B1 | 11/2003 | Mogul | |
| 6,678,835 B1 | 1/2004 | Shah et al. | |
| 6,748,429 B1 | 6/2004 | Talluri et al. | |
| 6,829,685 B2 | 12/2004 | Neal et al. | |
| 6,904,545 B1 | 6/2005 | Erimli et al. | |
| 6,941,350 B1 | 9/2005 | Frazier et al. | |
| 6,963,932 B2 | 11/2005 | Bhat | |
| 6,978,300 B1 | 12/2005 | Beukema et al. | |
| 6,981,025 B1 | 12/2005 | Frazier et al. | |
| 6,985,956 B2 | 1/2006 | Luke et al. | |
| 7,023,811 B2 | 4/2006 | Pinto | |
| 7,069,468 B1 | 6/2006 | Olson et al. | |
| 7,113,995 B1 | 9/2006 | Beukema et al. | |
| 7,185,025 B2 | 2/2007 | Rosenstock et al. | |
| 7,194,540 B2 | 3/2007 | Aggarwal et al. | |
| 7,200,704 B2 * | 4/2007 | Njoku et al. | 710/316 |
| 7,216,163 B2 | 5/2007 | Sinn | |
| 7,221,676 B2 | 5/2007 | Green | |
| 7,231,518 B1 | 6/2007 | Bakke | |
| 7,290,277 B1 | 10/2007 | Chou et al. | |
| 7,302,484 B1 | 11/2007 | Stapp et al. | |
| 7,356,841 B2 * | 4/2008 | Wilson et al. | 726/15 |
| 7,398,394 B1 | 7/2008 | Johnsen et al. | |
| 7,409,432 B1 | 8/2008 | Recio et al. | |
| 7,437,447 B2 | 10/2008 | Brey et al. | |
| 7,493,409 B2 | 2/2009 | Craddock et al. | |
| 7,500,236 B2 * | 3/2009 | Janzen | 717/174 |
| 7,633,955 B1 * | 12/2009 | Saraiya et al. | 370/401 |
| 7,634,608 B2 | 12/2009 | Droux et al. | |
| 7,636,772 B1 | 12/2009 | Kirby et al. | |
| 7,653,668 B1 | 1/2010 | Shelat | |
| 7,685,385 B1 | 3/2010 | Choudhary et al. | |
| 7,724,748 B2 | 5/2010 | Davis | |
| 7,783,788 B1 * | 8/2010 | Quinn et al. | 710/8 |
| 7,843,822 B1 | 11/2010 | Paul et al. | |
| 7,860,961 B1 * | 12/2010 | Finkelstein et al. | 709/223 |
| 7,873,711 B2 | 1/2011 | Adams et al. | |
| 8,184,555 B1 | 5/2012 | Mouton et al. | |
| 8,291,148 B1 | 10/2012 | Shah et al. | |
| 8,327,437 B2 | 12/2012 | McAlister | |
| 8,331,381 B2 | 12/2012 | Brown et al. | |
| 8,335,915 B2 | 12/2012 | Plotkin et al. | |
| 8,423,780 B2 | 4/2013 | Plotkin et al. | |
| 8,549,281 B2 | 10/2013 | Samovskiy et al. | |
| 8,583,921 B1 | 11/2013 | Shu | |
| 2002/0059597 A1 | 5/2002 | Kikinis et al. | |
| 2002/0120720 A1 | 8/2002 | Moir | |
| 2002/0188711 A1 | 12/2002 | Meyer et al. | |
| 2003/0009487 A1 | 1/2003 | Prabakaran et al. | |
| 2003/0009551 A1 | 1/2003 | Benfield et al. | |
| 2003/0033427 A1 | 2/2003 | Brahmaroutu | |
| 2003/0079040 A1 * | 4/2003 | Jain et al. | 709/238 |
| 2003/0093509 A1 | 5/2003 | Li et al. | |
| 2003/0105903 A1 | 6/2003 | Garnett et al. | |
| 2003/0120852 A1 | 6/2003 | McConnell et al. | |
| 2003/0208572 A1 | 11/2003 | Shah et al. | |
| 2004/0022245 A1 | 2/2004 | Forbes et al. | |
| 2004/0153849 A1 | 8/2004 | Tucker et al. | |
| 2004/0199764 A1 | 10/2004 | Koechling et al. | |
| 2004/0220947 A1 | 11/2004 | Aman et al. | |
| 2004/0249928 A1 | 12/2004 | Jacobs et al. | |
| 2005/0044363 A1 | 2/2005 | Zimmer et al. | |
| 2005/0071382 A1 | 3/2005 | Rosenstock et al. | |
| 2005/0071709 A1 | 3/2005 | Rosenstock et al. | |
| 2005/0086342 A1 | 4/2005 | Burt et al. | |
| 2005/0091396 A1 * | 4/2005 | Nilakantan et al. | 709/232 |
| 2005/0105554 A1 | 5/2005 | Kagan et al. | |
| 2005/0125520 A1 | 6/2005 | Hanson et al. | |
| 2005/0182831 A1 | 8/2005 | Uchida et al. | |
| 2005/0182853 A1 * | 8/2005 | Lewites et al. | 709/238 |
| 2005/0198164 A1 | 9/2005 | Moore et al. | |
| 2005/0198250 A1 | 9/2005 | Wang | |
| 2005/0213608 A1 | 9/2005 | Modi | |
| 2005/0273641 A1 | 12/2005 | Sandven et al. | |
| 2006/0079278 A1 | 4/2006 | Ferguson et al. | |
| 2006/0112297 A1 | 5/2006 | Davidson | |
| 2006/0114863 A1 | 6/2006 | Sanzgiri | |
| 2006/0195560 A1 | 8/2006 | Newport | |
| 2006/0221975 A1 * | 10/2006 | Lo | H04L 12/18 370/395.5 |
| 2006/0233168 A1 * | 10/2006 | Lewites et al. | 370/389 |
| 2007/0110245 A1 | 5/2007 | Sood et al. | |
| 2007/0129917 A1 | 6/2007 | Blevins | |
| 2007/0195774 A1 | 8/2007 | Sherman | |
| 2007/0195794 A1 * | 8/2007 | Fujita et al. | 370/395.53 |
| 2007/0206735 A1 | 9/2007 | Silver et al. | |
| 2007/0253328 A1 | 11/2007 | Harper et al. | |
| 2008/0031266 A1 * | 2/2008 | Tallet | H04L 12/462 370/401 |
| 2008/0144614 A1 | 6/2008 | Fisher et al. | |
| 2008/0159277 A1 * | 7/2008 | Vobbilisetty et al. | 370/357 |
| 2008/0183853 A1 * | 7/2008 | Manion et al. | 709/223 |
| 2008/0192750 A1 | 8/2008 | Ko et al. | |
| 2008/0201486 A1 * | 8/2008 | Hsu et al. | 709/238 |
| 2008/0209018 A1 | 8/2008 | Hernandez et al. | |
| 2008/0229096 A1 | 9/2008 | Alroy et al. | |
| 2008/0250125 A1 | 10/2008 | Brey et al. | |
| 2008/0288646 A1 | 11/2008 | Hasha | |
| 2008/0310421 A1 * | 12/2008 | Teisberg | H04L 12/4641 370/395.53 |
| 2008/0310422 A1 * | 12/2008 | Booth | H04L 12/4641 370/395.53 |
| 2009/0049164 A1 * | 2/2009 | Mizuno | 709/223 |
| 2009/0116404 A1 | 5/2009 | Mahop et al. | |
| 2009/0141728 A1 * | 6/2009 | Brown et al. | 370/395.31 |
| 2009/0216853 A1 | 8/2009 | Burrow et al. | |
| 2009/0249472 A1 | 10/2009 | Litvin et al. | |
| 2009/0271472 A1 | 10/2009 | Scheifler | |
| 2009/0307499 A1 | 12/2009 | Senda | |
| 2009/0327462 A1 | 12/2009 | Adams et al. | |
| 2010/0014526 A1 * | 1/2010 | Chavan | H04L 49/35 370/395.53 |
| 2010/0020806 A1 | 1/2010 | Vahdat et al. | |
| 2010/0080117 A1 | 4/2010 | Coronado et al. | |
| 2010/0082853 A1 | 4/2010 | Block et al. | |
| 2010/0114826 A1 | 5/2010 | Voutilainen | |
| 2010/0138532 A1 | 6/2010 | Glaeser et al. | |
| 2010/0142544 A1 | 6/2010 | Chapel et al. | |
| 2010/0166167 A1 | 7/2010 | Karimi-Cherkandi et al. | |
| 2010/0235488 A1 | 9/2010 | Sharma et al. | |
| 2010/0268857 A1 | 10/2010 | Bauman et al. | |
| 2010/0306772 A1 | 12/2010 | Arnold et al. | |
| 2011/0022574 A1 | 1/2011 | Hansen | |
| 2011/0072206 A1 | 3/2011 | Ross et al. | |
| 2011/0110366 A1 | 5/2011 | Moore et al. | |
| 2011/0138185 A1 | 6/2011 | Ju et al. | |
| 2011/0173302 A1 | 7/2011 | Rider | |
| 2011/0209202 A1 | 8/2011 | Otranen | |
| 2011/0222492 A1 | 9/2011 | Borsella et al. | |
| 2011/0264577 A1 * | 10/2011 | Winbom et al. | 705/37 |
| 2011/0283017 A1 | 11/2011 | Alkhatib | |
| 2012/0005480 A1 | 1/2012 | Batke et al. | |
| 2012/0039331 A1 | 2/2012 | Astigarraga et al. | |
| 2012/0195417 A1 | 8/2012 | Hua et al. | |
| 2012/0239928 A1 | 9/2012 | Judell | |
| 2012/0290698 A1 | 11/2012 | Alroy et al. | |
| 2013/0041969 A1 | 2/2013 | Falco et al. | |

(56) References Cited

U.S. PATENT DOCUMENTS

2013/0138836 A1   5/2013   Cohen et al.
2013/0159865 A1   6/2013   Smith et al.
2014/0095876 A1   4/2014   Smith et al.

FOREIGN PATENT DOCUMENTS

| EP | 2 051 436 A1 | 4/2009 |
|---|---|---|
| JP | 2002 247089 | 8/2002 |
| JP | 2004166263 | 6/2004 |
| JP | 2006157285 | 6/2006 |
| JP | 2007501563 | 1/2007 |
| JP | 2008 054214 | 3/2008 |
| JP | 2009510953 | 3/2009 |
| WO | 01/90838 | 11/2001 |
| WO | 2008099479 | 8/2008 |

OTHER PUBLICATIONS

Shanley, Tom, Infiniband Network Architecture (excerpt), Pearson Education, published 2002, p. 209-211, 393-394, 551, 554.
European Patent Office International Searching Authority, International Search Report and Written Opinion dated Dec. 15, 2011 for Application No. PCT/US2011/052021, 9 pages.
European Patent Office International Searching Authority, International Search Report and Written Opinion dated Dec. 15, 2011for Application No. PCT/US2011/052033, 11 pages.
European Patent Office International Searching Authority, International Search Report and Written Opinion dated Jan. 11, 2012 for Application No. PCT/US2011/052029, 9 pages.
European Patent Office International Searching Authority, International Search Report and Written Opinion dated Sep. 12, 2012 for Application No. PCT/US2012/040775, 13 pages.
Aurelio Bermudez, On the InfiniBand Subnet Discovery Process, IEEE the Computer Society 2003, pp. 1-6.
Tom Shanley, Infiniband Network Architecture, Pearson Education 2002, p. 559, 561.
Tom Shanley, Infiniband Network Architecture (excerpt), chapter—Detailed Description of the Link Layer, Pearson Education, published 2002, p. 390-392, 485, 491-493, 537-539.
Manhee Lee, Security Enhancement in Infiniband Architecture, Apr. 2005, IEEE, vol. 19, pp. 1-18.
Shanley, Tom, "Infiniband Network Architecture" (excerpt), Pearson Education, Copyright © 2002 by MindShare, Inc., published Oct. 2002, p. 204-209, 560-564.
Shanley, Tom, "Infiniband Network Architecture", Pearson Education, Copyright © 2002 by MindShare, Inc., published Oct. 2002 p. 387-394.
State Intellectual Property Office of the People's Republic of China, Search Report dated May 29, 2015 for Chinese Patent Application No. 201180040064.9, 1 page.
State Intellectual Property Office of the People's Republic of China, Search Report dated Jun. 3, 2015 for Chinese Patent Application No. 201180039807.0, 2 pages.
State Intellectual Property Office of the People's Republic of China, Search Report dated Sep. 9, 2015 for Chinese Patent Application No. 201280027279.1, 2 pages.
Tom Shanley, Infiniband Network Architecture (excerpt), Pearson Education, Published 2002, p. 213.
United States Patent and Trademark Office, Office Action mailed Apr. 8, 2016 for U.S. Appl. No. 13/235,130, 32 pages.
United States Patent and Trademark Office, Office Action mailed Apr. 8, 2016 for U.S. Appl. No. 13/235,161, 24 pages.
United States Patent and Trademark Office, Office Action Dated May 6, 2016 for U.S. Appl. No. 13/488,192, 14 Pages.
Shanley, Tom, "Infiniband Network Architecture" (Excerpt), Copyright 2002 by Mindshare, Inc., p. 86-87.
Shanley, Tom, "Infiniband Network Architecture", Pearson Education, Copyright © 2001 by MindShare, Inc., published Oct. 2002, p. 387-394.
Shanley, Tom, "Infiniband Network Architecture", Pearson Education, Copyright © 2002 by MindShare, Inc., published Oct. 2002, p. 83-87, 95-102, 205-208, 403-406.
Shanley, Tom, "Infiniband Network Architecture", Pearson Education, Copyright © 2002 by MindShare, Inc., published Oct. 2002, p. 206-208, 403-406.
Kashyap, V., "IP over InfiniBand (IpoIB) Architecture", Network Working Group, Request for Comments: 4392, Apr. 2006, 22 pages.
State Intellectual Property Office of the People's Republic of China dated May 5, 2015 for Chinese Patent Application No. 201180039850.7, 2 pages.
Shanley, Tom, "Infiniband Network Architecture" (Excerpt), Copyright 2002 by Mindshare, Inc., pp. 8-9, 391-396, 549-551.
United States Patent and Trademark Office, Office Action Dated Nov. 30, 2016 for U.S. Appl. No. 13/488,088, 19 Pages.

* cited by examiner

SYSTEM AND METHOD FOR PROVIDING ETHERNET OVER NETWORK VIRTUAL HUB SCALABILITY IN A MIDDLEWARE MACHINE ENVIRONMENT

CLAIM OF PRIORITY

This application claims the benefit of priority on U.S. Provisional Patent Application No. 61/384,228, entitled "SYSTEM FOR USE WITH A MIDDLEWARE MACHINE PLATFORM" filed Sep. 17, 2010; U.S. Provisional Patent Application No. 61/484,390, entitled "SYSTEM FOR USE WITH A MIDDLEWARE MACHINE PLATFORM" filed May 10, 2011; U.S. Provisional Patent Application No. 61/493,330, entitled "STATEFUL SUBNET MANAGER FAILOVER IN A MIDDLEWARE MACHINE ENVIRONMENT" filed Jun. 3, 2011; U.S. Provisional Patent Application No. 61/493,347, entitled "PERFORMING PARTIAL SUBNET INITIALIZATION IN A MIDDLEWARE MACHINE ENVIRONMENT" filed Jun. 3, 2011; U.S. Provisional Patent Application No. 61/498,329, entitled "SYSTEM AND METHOD FOR SUPPORTING A MIDDLEWARE MACHINE ENVIRONMENT" filed Jun. 17, 2011, each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting a middleware machine environment.

BACKGROUND

INFINIBAND® (IB) Architecture is a communications and management infrastructure that supports both I/O and interprocessor communications for one or more computer systems. An IB Architecture system can scale from a small server with a few processors and a few I/O devices to a massively parallel installation with hundreds of processors and thousands of I/O devices.

The IB Architecture defines a switched communications fabric allowing many devices to concurrently communicate with high bandwidth and low latency in a protected, remotely managed environment. An end node can communicate with over multiple IB Architecture ports and can utilize multiple paths through the IB Architecture fabric. A multiplicity of IB Architecture ports and paths through the network are provided for both fault tolerance and increased data transfer bandwidth.

These are the generally areas that embodiments of the invention are intended to address.

SUMMARY

Described herein is a system and method for supporting a middleware machine environment that include one or more gateway nodes. One or more gateways that resides on the one or more gateway nodes are provided in a subnet with a plurality of host servers, wherein each host server is associated with one or more virtual network interface cards (vNICs). The middleware machine environment also include a plurality of virtual hubs (vHUB) on the one or more gateways, with each vHUB associated with one or more said vNICs. The gateways are adapted to connect with an external network, and operate to forward a multicast packet to both the external network and the plurality of host servers via the plurality of vHUBs, and prevent multicast packet traffic loops between the subnet and the external network.

DETAILED DESCRIPTION

Described herein is a system and method for providing a middleware machine or similar platform. In accordance with an embodiment of the invention, the system comprises a combination of high performance hardware (e.g. 64-bit processor technology, high performance large memory, and redundant INFINIBAND® and Ethernet networking) together with an application server or middleware environment, such as WebLogic Suite, to provide a complete Java EE application server complex which includes a massively parallel in-memory grid, that can be provisioned quickly, and that can scale on demand. In accordance with an embodiment of the invention, the system can be deployed as a full, half, or quarter rack, or other configuration, that provides an application server grid, storage area network, and INFINIBAND® (IB) network. The middleware machine software can provide application server, middleware and other functionality such as, for example, WebLogic Server, JRockit or Hotspot JVM, Oracle Linux or Solaris, and Oracle VM. In accordance with an embodiment of the invention, the system can include a plurality of compute nodes, one or more IB switch gateways, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

Figure 1:
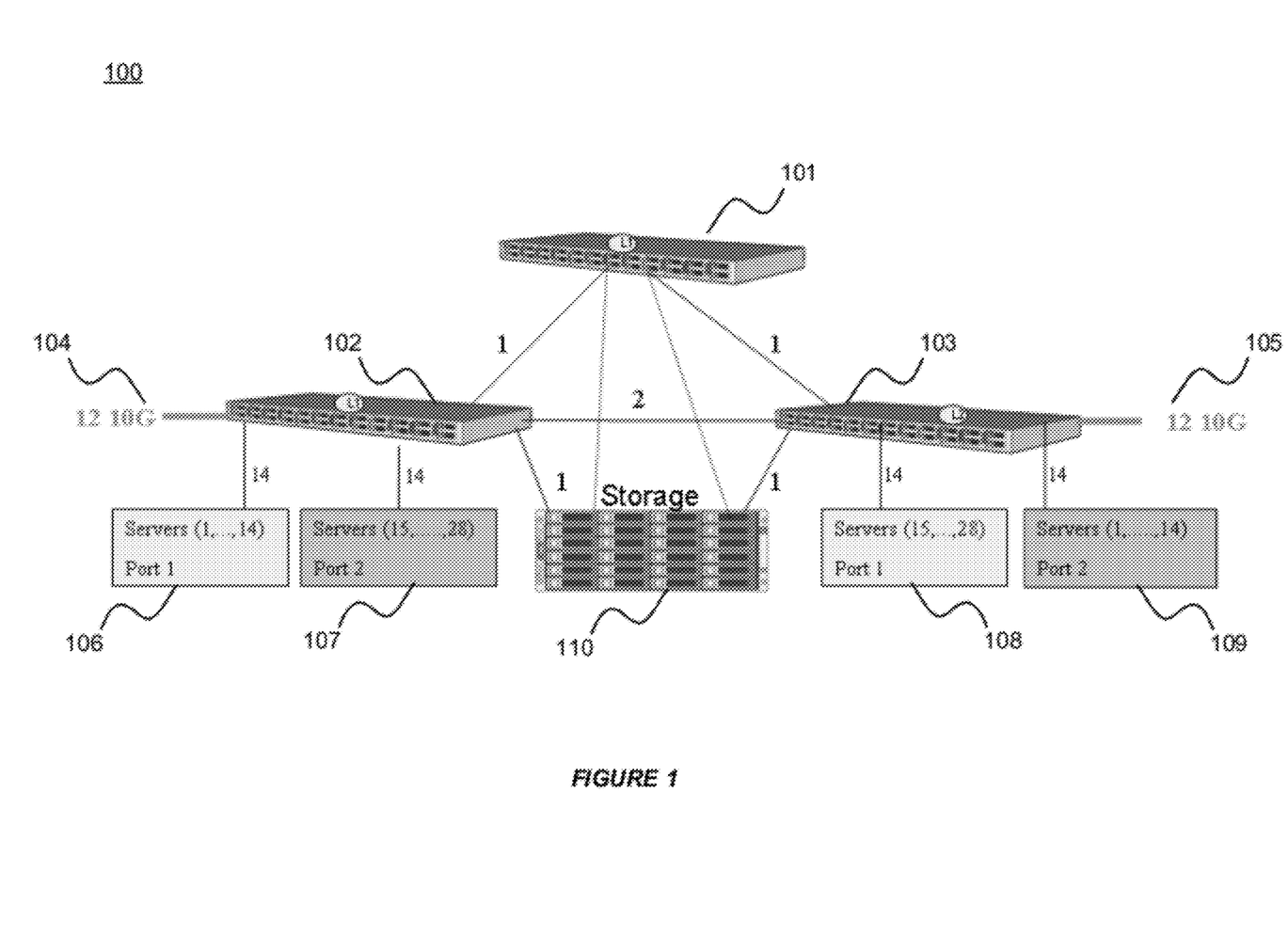
FIG. 1 shows an illustration of an exemplary configuration for a middleware machine, in accordance with an embodiment of the invention.

FIG. 1 shows an illustration of an exemplary configuration for a middleware machine, in accordance with an embodiment of the invention. As shown in FIG. 1, the middleware machine 100 uses a single rack configuration that includes two gateway network switches, or leaf network switches, 102 and 103 that connect to twenty-eight server nodes. Additionally, there can be different configurations for the middleware machine. For example, there can be a half rack configuration that contains a portion of the server nodes, and there can also be a multi-rack configuration that contains a large number of servers.

As shown in FIG. 1, the server nodes 106-109 can connect to the ports provided by the gateway network switches 102-103. Furthermore, each server machine can have connections to the two gateway network switches 102 and 103 separately. For example, the gateway network switch 102 connects to the port 1 of the servers 1-14 106 (14 connections) and the port 2 of the servers 15-28 107 (14 connections), and the gateway network switch 103 connects to the port 1 of the servers 15-28 108 (14 connections) and the port 2 of the servers 1-14 109 (14 connections).

In accordance with an embodiment of the invention, each gateway network switch can have multiple internal ports that are used to connect with different servers, and the gateway network switch can also have external ports that are used to connect with an external network, such as an existing data center service network 104-105 (12 10G connections).

In accordance with an embodiment of the invention, the middleware machine can include a separate storage system 110 that connects to the servers through the gateway network switches 102-103 using single (1) link. Additionally, the middleware machine can include a spine network switch 101 that connects to the two gateway network switches 102 and 103 using single (1) link. As shown in FIG. 1, there can be optionally two (2) links from the storage system to the spine network switch.

IB Fabric/Subnet

In accordance with an embodiment of the invention, an IB Fabric/Subnet in a middleware machine environment can contain a large number of physical hosts or servers, switch instances and gateway instances that are interconnected in a fat-tree topology.

Figure 2:
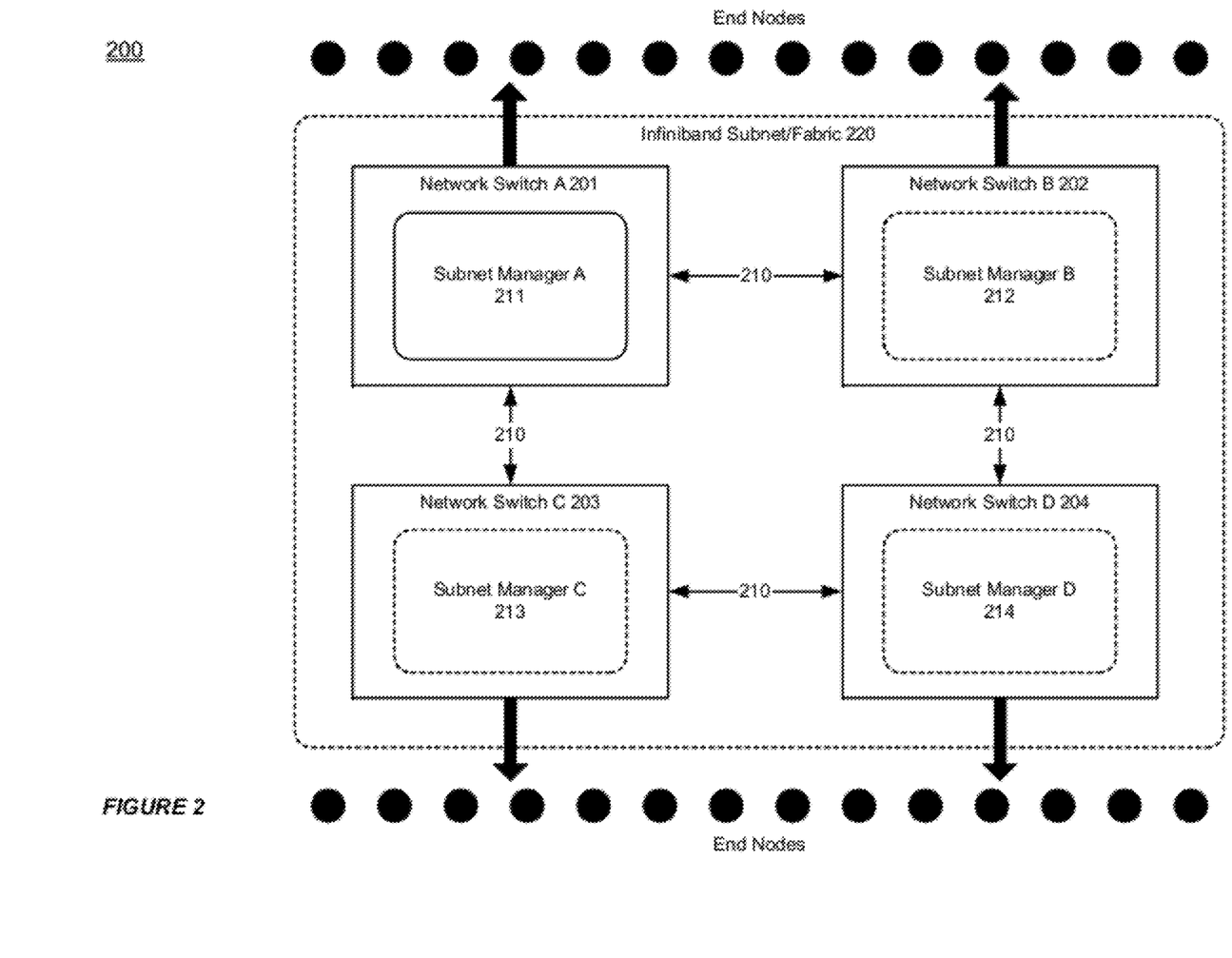
FIG. 2 shows an illustration of a middleware machine environment, in accordance with an embodiment of the invention.

FIG. 2 shows an illustration of a middleware machine environment, in accordance with an embodiment of the invention. As shown in FIG. 2, the middleware machine environment 200 includes an IB subnet or fabric 220 that connects with a plurality of end nodes. The IB subnet includes a plurality of subnet managers 211-214, each of which resides on one of a plurality of network switches 201-204. The subnet managers can communicate with each other using an in-band communication protocol 210, such as the Management Datagram (MAD)/Subnet Management Packet (SMP) based protocols or other protocol such as the Internet Protocol over IB (IPoIB).

In accordance with an embodiment of the invention, a single IP subnet can be constructed on the IB fabric allowing the switches to communicate securely among each other in the same IB fabric (i.e. full connectivity among all switches). The fabric based IP subnet can provide connectivity between any pair of switches when at least one route with operational links exists between the two switches. Recovery from link failures can be achieved if an alternative route exits by re-routing.

The management Ethernet interfaces of the switches can be connected to a single network providing IP level connectivity between all the switches. Each switch can be identified by two main IP addresses: one for the external management Ethernet and one for the fabric based IP subnet. Each switch can monitor connectivity to all other switches using both IP addresses, and can use either operational address for communication. Additionally, each switch can have a point-to-point IP link to each directly connected switch on the fabric. Hence, there can be at least one additional IP address.

IP routing setups allow a network switch to route traffic to another switch via an intermediate switch using a combination of the fabric IP subnet, the external management Ethernet network, and one or more fabric level point-to-point IP links between pairs of switches. IP routing allows external management access to a network switch to be routed via an external Ethernet port on the network switch, as well as through a dedicated routing service on the fabric.

The IB fabric includes multiple network switches with management Ethernet access to a management network. There is in-band physical connectivity between the switches in the fabric. In one example, there is at least one in-band route of one or more hops between each pair of switches, when the IB fabric is not degraded. Management nodes for the IB fabric include network switches and management hosts that are connected to the IB fabric.

A subnet manager can be accessed via any of its private IP addresses. The subnet manager can also be accessible via a floating IP address that is configured for the master subnet manager when the subnet manager takes on the role as a master subnet manager, and the subnet manager is unconfigured when it is explicitly released from the role. A master IP address can be defined for both the external management network as well as for the fabric based management IP network. No special master IP address needs to be defined for point-to-point IP links.

In accordance with an embodiment of the invention, each physical host can be virtualized using virtual machine based guests. There can be multiple guests existing concurrently per physical host, for example one guest per CPU core. Additionally, each physical host can have at least one dual-ported Host Channel Adapter (HCA), which can be virtualized and shared among guests, so that the fabric view of a virtualized HCA is a single dual-ported HCA just like a non-virtualized/shared HCA.

The IB fabric can be divided into a dynamic set of resource domains implemented by IB partitions. Each physical host and each gateway instance in an IB fabric can be a member of multiple partitions. Also, multiple guests on the same or different physical hosts can be members of the same or different partitions. The number of the IB partitions for an IB fabric may be limited by the P_Key table size.

In accordance with an embodiment of the invention, a guest may open a set of virtual network interface cards (vNICs) on two or more gateway instances that are accessed directly from a vNIC driver in the guest. The guest can migrate between physical hosts while either retaining or having updated vNIC associates.

In accordance with an embodiment of the invention, switchs can start up in any order and can dynamically select a master subnet manager according to different negotiation protocols, for example an IB specified negotiation protocol. If no partitioning policy is specified, a default partitioning enabled policy can be used. Additionally, the management node partition and the fabric based management IP subnet can be established independently of any additional policy information and independently of whether the complete fabric policy is known by the master subnet manager. In order to allow fabric level configuration policy information to be synchronized using the fabric based IP subnet, the subnet manager can start up initially using the default partition policy. When fabric level synchronization has been achieved, the partition configuration that is current for the fabric can be installed by the master subnet manager.

Providing Ethernet Over IB (EOIB) vHUB Scalability

In accordance with an embodiment of the invention, the system can provide Ethernet over IB (EOIB) Level 2 (L2) subnet implementations that scales both in terms of the number of member host ports on the IB fabric, and in terms of the number of gateway ports connecting to the corresponding L2 subnet on the external Ethernet fabric.

Figure 3:
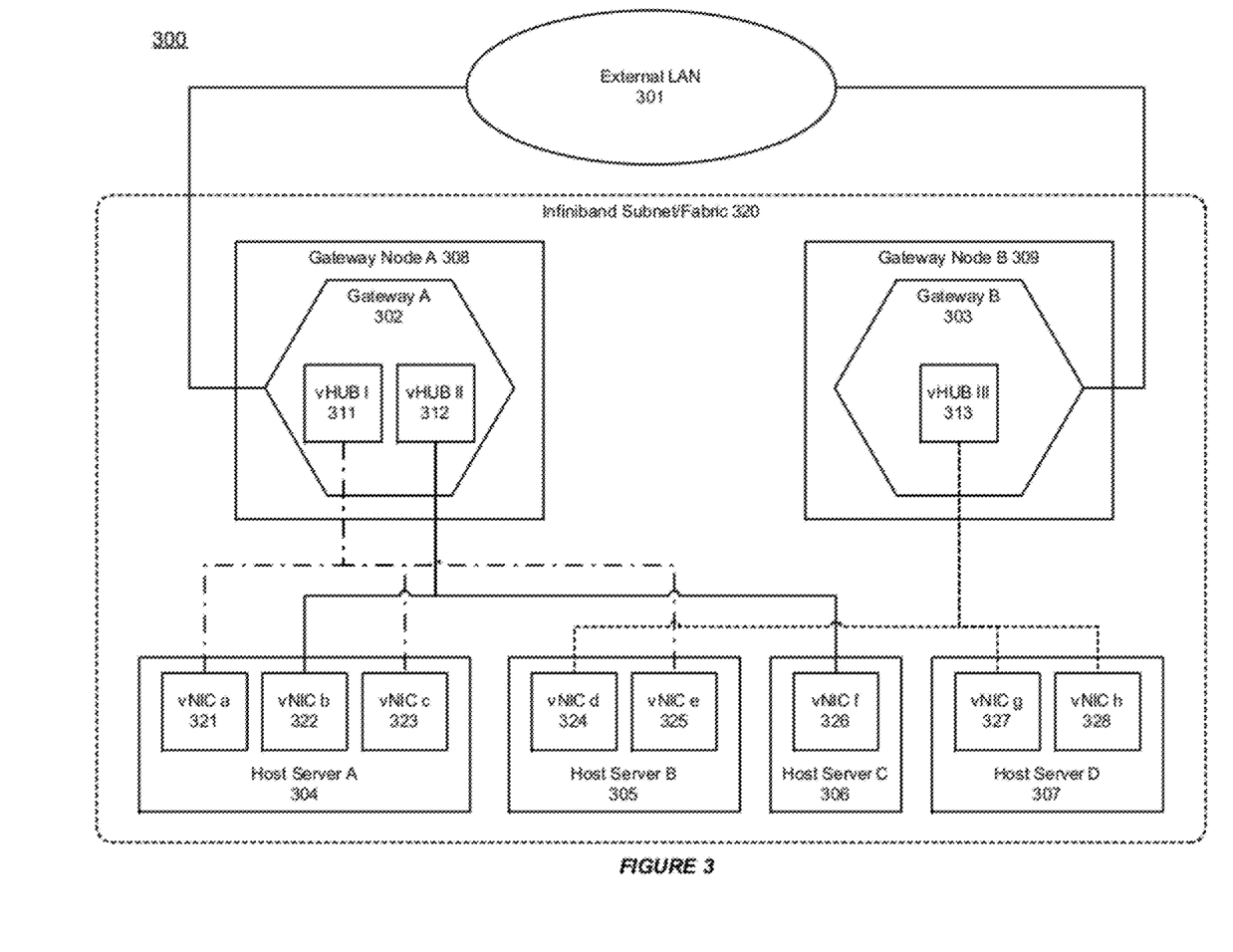
FIG. 3 shows an illustration of a middleware machine environment that provides Ethernet over IB (EOIB) vHUB scalability, in accordance with an embodiment of the invention.

FIG. 3 shows an illustration of a middleware machine environment that provides EOIB vHUB scalability, in accordance with an embodiment of the invention. As shown in FIG. 3, a middleware machine environment 300 includes an IB subnet/fabric 320, which can be connected with a plurality of host servers 304-307 and an external local area network (LAN) 301. The IB fabric includes several gateways 302-303, which are associated with different vNICs 321-328. Each gateway instance can reside on a gateway node 308-309 that contains one or more microprocessors, and the core gateway function in the gateway instance can be implemented in hardware using a "data path" operation.

In accordance with an embodiment of the invention, a gateway in the system can be associated with different vHUBs. Each vHUB defines a logical level 2 link on the IB fabric side that contains vNICs associated with the same gateway instance. The vNICs and the hosts that belong to the same vHUB can communicate with each other without involving the associated gateway instance.

In the example as shown in FIG. 3, vHUB I 311 on gateway A is associated with vNIC a 321 and vNIC c 323 on host server A, and vNIC e 325 on host server B. Hence, vNIC a, vNIC c, and vNIC e can communicate with each other without involving the associated gateway A. Also as shown in FIG. 3, vHUB II 312 on gateway A is associated with vNIC b 322 on host server A and vNIC f 326 on host server C; and vHUB III 313 on gateway B is associate with vNIC d 324 on host server B, and vNIC g 327 and vNIC h 328 on host server D.

In accordance with an embodiment of the invention, several vHUBs can represent the same logical Ethernet L2 link and/or the same level 3 (L3) IP subnet. In the example as shown in FIG. 3, gateway A 302 and gateway B 303 both connect to the same external LAN 301 via multiple gateway ports. Various vNICs 321-328 that belong to the different vHUBs 311-313 can be connected and can communicate with each other through the external LAN 301, or alternatively by routing logic implemented by hosts on the IB fabric.

In accordance with an embodiment of the invention, a separate IP subnet (IPoIB or EoIB) can be provided on the IB fabric side for handling high bandwidth IP traffic between the hosts on the IB fabric, and between the hosts and the external LAN. This separate IP subnet on the IB fabric side can avoid wasting gateway bandwidth for traffic among hosts on the IB fabric. Additionally, when multiple IP subnets are not desirable, it can be useful to allow communication between vNICs that belongs to different vHUBs on the internal IB fabric.

In the example as shown in FIG. 3, when multiple vHUBs 311-313 are connected together, a multicast packet can be forwarded to both the external LAN 301 through the gateway instances 302-303 and to the member host ports on the host servers 304-307 in the IB fabric. For example, a first gateway port in the IB fabric 302 can send a multicast packet to an external LAN 301, which may send the multicast packet back to a second gateway port in the IB fabric 320. The second gateway port can in turn forward the multicast packet again on the IB fabric. This can lead to traffic loops between the IB fabric 320 and the external network 301. Additionally, an internal vNIC 321-328 and a gateway port may receive multiple versions of the same logical packet.

In order to solve the inbound packet loop problem that concerns traffic from external network to the IB fabric, the gateway instances can forward incoming multicast packets to an IB multicast group that represents a private vHUB, which has a single gateway member and allows each vNIC to be a member of a single private vHUB.

In order to solve the outbound packet loop problem that concerns traffic from IB fabric to external network, each gateway instance can detect if a multicast packet that is received from the local IB fabric is originating from a vNIC in its private vHUB. The gateway instance can proceed to forward the multicast packet to the external network if the multicast packet is originating from a vNIC in its private vHUB. Dedicated hardware logic can be used to make such decisions. In one example, this dedicated hardware logic can use either information about the local vNICs, or one or more sets of range registers for source Media Access Control (MAC) addresses in the private vHUB.

In accordance with an embodiment of the invention, an alternative approach can require that multicast packets forwarded between different private vHUBs have to involve the external LAN, such that the underlying IB multicast groups are always limited to a single private vHUB. At the same time, unicast traffic can span multiple vHUBs. This alternative approach can solve the inbound loop problem and can also ensure that only a single version of a multicast packet is forwarded from the IB fabric to the external LAN.

In accordance with an embodiment of the invention, communication between vNICs belonging to different vHUBs can be implemented without depending on connectivity between the external gateway ports via the external Ethernet LAN. For unicast traffic, the host vNIC driver can explicitly send a single packet to a destination port on the IB fabric that the destination MAC/vNIC is associated with. Also, the host vNIC driver can send the single packet to a destination vNIC that belongs to a different vHUB. For multicast traffic, the system can ensure that only a single gateway instance forwards a specific multicast packet from a specific host or a vNIC to the external LAN. And, the multiple gateway instances, which receive a same logical multicast packet, may not forward the same logical multicast packet from external LAN to the same hosts or vNICs on the IB fabric.

In accordance with an embodiment of the invention, a special global vHUB multicast group can avoid dependency on the external LAN for multicast forwarding between private vHUBs, and also ensure that only a single version of a multicast packet is forwarded from the IB fabric to the external LAN. This special global vHUB multicast group can include only a single gateway instance and all relevant vNICs on the IB fabric. Using this approach, the system can avoid creating loops for traffic between the IB fabric and the external LAN. Furthermore, in order to avoid receiving multiple copies of multicast packets originating from a vNIC in another private vHUB, the EoIB driver can include logic to discard a multicast packet arriving from the gateway in its private vHUB, when the source MAC of the multicast packet is from a vNIC in the corresponding global vHUB.

A limitation of this approach is that more bandwidth may be consumed on the IB fabric because of packet forwarding in both the global vHUB as well as in the various private vHUBs that receive the packet from the external LAN. Also, the restriction of only a single egress gateway instance for sending multicast packets may require that bonding and other host based IP multi-pathing schemes depend on global-vHUB reconfiguration in order to restore external multicast sending capability after failure of the current egress gateway instance. Thus, the multicast bandwidth from the IB fabric to the external LAN may also be limited by the single egress gateway instance.

In accordance with an embodiment of the invention, the system can manage the communication between vNICs belonging to different vHUBs using a source MAC address filtering approach. In the example as shown in FIG. 3, each gateway instance 302-303 in the IB fabric 320 can detect whether a source MAC address of a multicast packet received from an external LAN 301 belongs to a relevant vNIC 321-328 on the local IB fabric 320.

In accordance with an embodiment of the invention, the system can use one or more sets of range registers that define source MAC addresses belonging to relevant vNICs on the local IB fabric, in order to prevent sending a multicast packet in loops between the IB fabric and the external LAN that wastes network bandwidth resources, and ensure that the internal vNIC or gateway ports will not receive duplicated versions of a same logic multicast packet.

In accordance with an embodiment of the invention, the system can use a dedicated multicast group to distribute multicast packets to vNICs on the IB fabric, but not to any gateway instances. In order to ensure that exactly one copy of a multicast packet is sent out to the external LAN via exactly one gateway external port, the vNIC driver can send the packet to a single gateway (e.g. the one associated with the vHUB that the local vNIC belongs to). This multicast packet can then be received by other gateway external ports via the external Ethernet LAN and be replicated to vNICs belonging to other vHUBs.

The receiving vNIC drivers can determine that the source MAC in the packet belongs to a vNIC on the IB fabric that is part of the same logical subnet. Then, the vNIC drivers can discard the packet since the packet have already been, or will be, received via the said dedicated multicast group on the IB fabric. On the other hand, if the received multicast packet source address is determined to belong to a station on the external Ethernet LAN (i.e. as opposed to a vNIC on the local IB fabric), the multicast packet can be processed accordingly.

In accordance with an embodiment of the invention, with a scheme for filtering out copies of multicast packets, it is possible to use one global multicast group to forward multicast packets within the global vHUB on the IB fabric, and it is also possible to allow the sending EoIB driver to explicitly send another packet copy to be forwarded by the gateway instance in its private vHUB, for example via unicast. This scheme allows any number of gateway instances to be used as egress ports for outbound MC traffic (i.e. one active egress gateway per private vHUB).

In accordance with an embodiment of the invention, a hybrid L2 link can be used in an IB fabric, in which case a single IB fabric internal EoIB vHUB, which is similar to an IPoIB link, can be combined with one or more vHUBs that are only used for external traffic. The gateway's ability to filter multicast packets from the external LAN based on source address can prevent wasting of IB fabric bandwidth on duplicate multicast packets.

In accordance with an embodiment of the invention, for the situations when the IPoIB Connected Mode (CM) provides better bandwidth than EoIB based IP traffic, the IPoIB CM can be merged with EoIB in order to allow a single IP subnet to span any number of nodes on the IB fabric as well as any number of gateway instances and nodes on the external LAN, while still providing the best possible bandwidth between any pair of endpoints.

Figure 4:
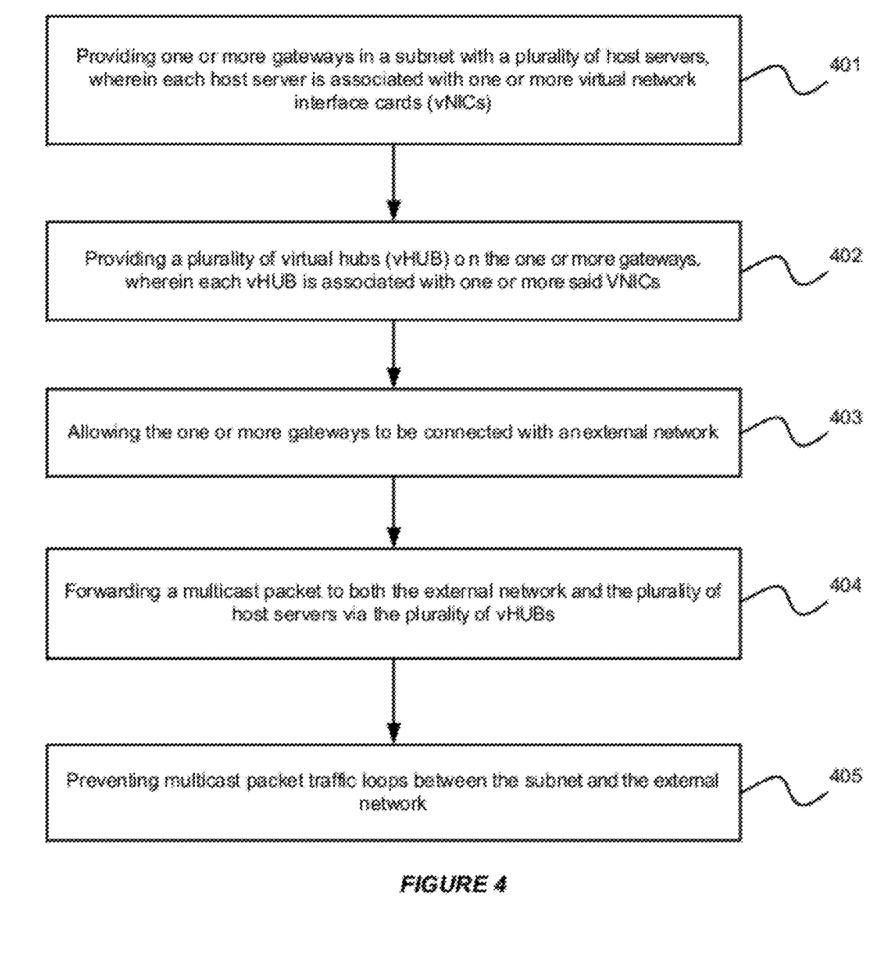
FIG. 4 illustrates an exemplary flow chart for providing EOIB vHUB scalability in a middleware machine environment, in accordance with an embodiment of the invention.

FIG. 4 illustrates an exemplary flow chart for providing scalability in a middleware machine environment, in accordance with an embodiment. As shown in FIG. 4, at step 401, one or more gateways can be provided in a subnet with a plurality of host servers, wherein each host server is associated with one or more virtual network interface cards (vNICs). Then, at step 402, a plurality of virtual hubs (vHUBs) can be provided on the one or more gateways, wherein each vHUB is associated with one or more said vNICs. Additionally, the one or more gateways can be connected with an external network, at step 403. Also, the one or more gateways can forward a multicast packet to both the external network and the plurality of host servers via the plurality of vHUBs at step 404. Finally, at step 405, the one or more gateways can prevent multicast packet traffic loops between the subnet and the external network.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting a network having an InfiniBand architecture, the network including a subnet comprising a first gateway and a second gateway in communication with an external Ethernet network, a plurality of host servers and a plurality of virtual network interface cards (vNICs)

wherein each host server is associated with one or more of said plurality of vNICs, said method comprising:

providing a first private virtual hub (vHUB) on said first gateway wherein a first subset of said plurality of vNICs is in communication with said first vHUB;

providing a second vHUB on said second gateway wherein a second subset of said plurality of vNICs is in communication with said second vHUB, and said first vHUB is in communication with said second vHUB;

receiving at said first vHUB a first multicast packet originating from a vNIC in said first subset of vNICs;

detecting with said first gateway that said first multicast packet originated from said first subset of vNICs, and forwarding said first multicast packet from said first gateway to said external Ethernet network, and to host servers associated with the first subset of vNICs; and receiving at said first vHUB a second multicast packet originating from a vNIC in said second subset of vNICs;

detecting with said first gateway that said second multicast packet did not originate from said first subset of vNICs, and forwarding said second multicast packet from said first gateway to host servers associated with the first subset of vNICs without forwarding said second multicast packet to the external Ethernet network;

receiving at said second vHUB said first multicast packet originating from said vNIC in said first subset of vNICs;

detecting with said second gateway that said first multicast packet did not originate from said second subset of vNICs, and forwarding said first multicast packet from said second gateway to host servers associated with the second subset of vNICs without forwarding said first multicast packet to the external Ethernet network;

receiving at said second vHUB said second multicast packet originating from said vNIC in said second subset of vNICs; and detecting with said second gateway that said second multicast packet originated from said second subset of vNICs, and forwarding said multicast packet from said second gateway to said external Ethernet network, and to host servers associated with the second subset of vNICs;

whereby only a single copy of said first multicast packet is transmitted from said network having the InfiniBand architecture to said external Ethernet network via said first gateway, and whereby only a single copy of said second multicast packet is transmitted from said network having the InfiniBand architecture to said external Ethernet network via said second gateway.

2. The method of claim 1, wherein each of said first gateway and second gateway includes a dedicated detecting hardware logic, and wherein:

detecting with said first gateway that said first multicast packet originated from said first subset of vNICs comprises detecting with said dedicated hardware logic of said first gateway using information about the first subset of vNICs that said first multicast packet originated from said first subset of vNICs;

detecting with said first gateway that said second multicast packet did not originate from said first subset of vNICs comprises detecting with said dedicated hardware logic of said first gateway using information about the first subset of vNICs that said second multicast packet did not originate from said first subset of vNICs;

detecting with said second gateway that said first multicast packet did not originate from said second subset of vNICs comprises detecting with said dedicated hardware logic of said second gateway using information about the first subset of vNICs that said first multicast packet did not originate from said first subset of vNICs; and detecting with said second gateway that said second multicast packet originated from said second subset of vNICs comprises detecting with said dedicated hardware logic of said second gateway using information about the first subset of vNICs that said second multicast packet originated from said first subset of vNICs.

3. The method of claim 1, wherein each of said first gateway and second gateway includes a dedicated detecting hardware logic, and wherein:

detecting with said first gateway that said first multicast packet originated from said first subset of vNICs comprises detecting with said dedicated hardware logic of said first gateway using range registers for Media Access Control (MAC) addresses in the first vHUB that said first multicast packet originated from said first subset of vNICs;

detecting with said first gateway that said second multicast packet did not originate from said first subset of vNICs comprises detecting with said dedicated hardware logic of said first gateway using range registers for Media Access Control (MAC) addresses in the first vHUB that said second multicast packet did not originate from said first subset of vNICs;

detecting with said second gateway that said first multicast packet did not originate from said second subset of vNICs comprises detecting with said dedicated hardware logic of said second gateway using range registers for Media Access Control (MAC) addresses in the second vHUB that said first multicast packet did not originate from said first subset of vNICs; and detecting with said second gateway that said second multicast packet originated from said second subset of vNICs comprises detecting with said dedicated hardware logic of said second gateway using range registers for Media Access Control (MAC) addresses in the second vHUB that said second multicast packet originated from said first subset of vNICs.

4. The method of claim 1, further comprising:

providing a global vHUB multicast group in communication with all of said plurality of vNICs in the subnet and only said first gateway;

receiving an inbound multicast packet from said external Ethernet network at said first gateway, and transmitting said inbound multicast packet to each of said plurality of vNICs in the subnet via said global vHUB multicast group.

5. The method of claim 1, wherein the first gateway and second gateway reside on a first network switch and a second network switch respectively.

6. The method of claim 1, wherein the first gateway and second gateway reside on a first network switch and a second network switch respectively, and wherein each of said first network switch and second network switch has an external port connected to said external Ethernet network and a plurality of internal ports connected to host servers of said plurality of hosts servers.

7. The method of claim 1, further comprising:
managing communications between vNICs is said first subset of vNICs and vNICs in said second subset of vNICs using source media access control (MAC) address filtering.

8. A system for supporting a middleware machine environment connected to an external Ethernet network, the system comprising:
a network having an InfiniBand architecture, the network comprising a subnet, said subnet comprising
a first gateway in communication with said external Ethernet network, said first gateway comprising a first private virtual hub (vHUB), and one or more microprocessors,
a second gateway in communication with said external Ethernet network, said second gateway comprising a second private virtual hub (vHUB), and one or more microprocessors,
a plurality of host servers and a plurality of virtual network interface cards (vNICs), wherein each host server is associated with one or more of said plurality of vNICs,
wherein a first subset of said plurality of vNICs is in communication with said first vHUB, a second subset of said plurality of vNICs is in communication with said second vHUB, and said first vHUB is in communication with said second vHUB;
wherein, in response to receiving at said first vHUB a first multicast packet originating from a vNIC in said first subset of vNICs, said first gateway selectively forwards, responsive to detecting that said first multicast packet originated from said first subset of vNICs, said first multicast packet to said external Ethernet network, and to host servers associated with the first subset of vNICs; and
wherein, in response to receiving at said first vHUB a second multicast packet originating from a vNIC in said second subset of vNICs, said first gateway selectively forwards, responsive to detecting that said second multicast packet did not originate from said first subset of vNICs, said second multicast packet to host servers associated with the first subset of vNICs without forwarding said second multicast packet to the external Ethernet network;
wherein, in response to receiving at said second vHUB said first multicast packet originating from said vNIC in said first subset of vNICs, said second gateway selectively forwards, responsive to detecting that said first multicast packet did not originate from said second subset of vNICs, said first multicast packet to host servers associated with the second subset of vNICs without forwarding said first multicast packet to the external Ethernet network; and
wherein, in response to receiving at said second vHUB said second multicast packet originating from said vNIC in said second subset of vNICs, said second gateway selectively forwards, responsive to detecting that said second multicast packet originated from said second subset of vNICs, said multicast packet to said external Ethernet network, and to host servers associated with the second subset of vNICs;
whereby only a single copy of said first multicast packet is transmitted from said network having the InfiniBand architecture to said external Ethernet network via said first gateway, and whereby only a single copy of said second multicast packet is transmitted from said network having the InfiniBand architecture to said external Ethernet network via said second gateway.

9. The system according to claim 8, further comprising:
a plurality of network switches, wherein the first gateway and second gateway reside on the plurality of network switches.

10. The system according to claim 9, wherein:
each said network switch provides one or more external ports that are used to connect with the external Ethernet network, and one or more internal ports that are used to connect with the plurality of host servers.

11. The system according to claim 8, wherein:
said first gateway includes multiple vHUBs.

12. The system according to claim 8, wherein:
the vNICs and host servers that belong to a same vHUB can communicate with each other without involving an associated gateway instance.

13. The system according to claim 8, wherein:
the vNICs and host servers that belong to different vHUBs can communicate with each other through corresponding gateway external ports and the external Ethernet network.

14. The system according to claim 8, wherein:
the first and second gateways operate to prevent an internal vNIC or a gateway port from receiving multiple versions of a same logical packet.

15. The system according to claim 8, wherein:
the first and second gateways operate to forward one or more incoming multicast packets received from the external Ethernet network to a multicast group.

16. The system according to claim 8, wherein:
the first and second gateways operate to use one or more sets of range registers to define different source MAC addresses associated with said plurality of vNICs.

17. The system according to claim 8, wherein:
the first and second gateways operate to manage communication between vNICs belonging to different vHUBs using a source media access control (MAC) address filtering approach.

18. The system according to claim 8, wherein:
the first and second gateways each include dedicated hardware logic that uses either information about the vNICs, or one or more sets of range registers for source Media Access Control (MAC) addresses in the private vHUB, to detect whether the first and second multicast packet originated from the first subset of vNICs in communication with said first vHUB or the second subset of vNICs in communication with said second vHUB.

19. The system according to claim 8, further comprising:
a global vHUB multicast group that include only a single gateway instance and all of said plurality of vNICs in the subnet.

20. A non-transitory computer readable medium having instructions stored thereon for supporting a network having an InfiniBand architecture, the network including a subnet comprising a first gateway and a second gateway in communication with an external Ethernet network and a plurality of host servers and a plurality of virtual network interface cards (vNICs) wherein each host server is associated with one or more of said plurality of vNICs, which instructions, when executed, cause a system to perform steps comprising:
providing a first private virtual hub (vHUB) on said first gateway wherein a first subset of said plurality of vNICs is in communication with said first vHUB;
providing a second vHUB on said second gateway wherein a second subset of said plurality of vNICs is in communication with said second vHUB, and said first vHUB is in communication with said second vHUB;

receiving at said first vHUB a first multicast packet originating from a vNIC in said first subset of vNICs;

detecting with said first gateway that said first multicast packet originated from said first subset of vNICs, and forwarding said first multicast packet from said first gateway to said external Ethernet network, and host servers associated with the first subset of vNICs; and receiving at said first vHUB a second multicast packet originating from a vNIC in said second subset of vNICs;

detecting with said first gateway that said second multicast packet did not originate from said first subset of vNICs, and forwarding said second multicast packet from said first gateway to host servers associated with the first subset of vNICs without forwarding said second multicast packet to the external Ethernet network;

receiving at said second vHUB said first multicast packet originating from said vNIC in said first subset of vNICs;

detecting with said second gateway that said first multicast packet did not originate from said second subset of vNICs, and forwarding said first multicast packet from said second gateway to host servers associated with the second subset of vNICs without forwarding said first multicast packet to the external Ethernet network;

receiving at said second vHUB said second multicast packet originating from said vNIC in said second subset of vNICs;

detecting with said second gateway that said second multicast packet originated from said second subset of vNICs, and forwarding said multicast packet from said second gateway to said external Ethernet network, and host servers associated with the second subset of vNICs; and whereby only a single copy of said first multicast packet is transmitted from said network having the InfiniBand architecture to said external Ethernet network via said first gateway, and whereby only a single copy of said second multicast packet is transmitted from said network having the InfiniBand architecture to said external Ethernet network via said second gateway.

* * * * *

UNITED STATES PATENT AND TRADEMARK OFFICE
CERTIFICATE OF CORRECTION

PATENT NO. : 9,614,746 B2
APPLICATION NO. : 13/235187
DATED : April 4, 2017
INVENTOR(S) : Bjorn-Dag Johnsen Page 1 of 1

It is certified that error appears in the above-identified patent and that said Letters Patent is hereby corrected as shown below:

On the Title Page

Item (60) Insert:
-- Related U.S. Application Data
Provisional Application No. 61/384,228, filed September 17, 2010,
Provisional Application No. 61/484,390, filed May 10, 2011,
Provisional Application No. 61/493,330, filed June 3, 2011,
Provisional Application No. 61/493,347, filed June 3, 2011,
Provisional Application No. 61/498,329, filed June 17, 2011. --.

In the Drawings (FIGURE 4) Sheet 4 of 4 (Reference Numeral 402), Delete "o n" and insert -- on --, therefor.

In the Specification

In Column 4, Line 61, Delete "switchs" and insert -- switches --, therefor.

Signed and Sealed this
Eighteenth Day of June, 2019

Andrei Iancu
*Director of the United States Patent and Trademark Office*